United States Patent [19]
Flegeo

[11] Patent Number: 6,166,337
[45] Date of Patent: Dec. 26, 2000

[54] DEVICE INCLUDING A PRINTED CIRCUIT BOARD WHICH IS CONTACTED BY DEPRESSING A KEY LOCATED AT A HOUSING WALL WHICH MAKES AN ANGLE WITH THE PRINTED CIRCUIT BOARD

[75] Inventor: Arnaud Flegeo, Challes, France

[73] Assignee: U.S. Phillips Corporation, New York, N.Y.

[21] Appl. No.: 09/444,898

[22] Filed: Nov. 22, 1999

[30] Foreign Application Priority Data

Nov. 26, 1998 [EP] European Pat. Off. .............. 98402961

[51] Int. Cl.[7] .................................................... H01H 13/70
[52] U.S. Cl. ........................... 200/5 A; 200/517; 200/341
[58] Field of Search ................................ 200/4, 5 R, 5 A, 200/510, 517, 341–345; 400/472, 490, 491, 491.2, 495, 495.1, 496

[56] References Cited

U.S. PATENT DOCUMENTS 5,227,774 7/1993 Bernoist ............................. 340/825.44
5,336,860 8/1994 Slocum ................................. 200/332.1
5,749,457 5/1998 Castaneda et al. ...................... 200/343
5,940,015 8/1999 Thornton et al. .......................... 341/20

*Primary Examiner*—Michael Friedhofer
*Attorney, Agent, or Firm*—Jack D. Slobod

[57] ABSTRACT

A device includes a housing, a built-in electric printed circuit board and a set of keys positioned near to a wall of the housing. At least a key portion movable by depression, positioned substantially perpendicularly to the wall, is present inside the housing and, aligned to the key portion, a first moving contact actuator portion, as well as a cooperating contact portion that makes breakable electrical contact with the printed circuit board. The depressible key portion is positioned on a first face of a first portion of an elastic carrier plate inside the housing and the first moving contact actuator portion is positioned on the facing second face. The contact portion is connected to a first face of the elastic carrier plate facing the printed circuit board. A second moving contact actuator portion is present on the second face of the second portion of the elastic carrier plate and is aligned to the contact portion. The first contact actuator portion cooperates with the second contact actuator portion and moves the second contact actuator portion in the direction of the contact portion.

6 Claims, 2 Drawing Sheets

DEVICE INCLUDING A PRINTED CIRCUIT BOARD WHICH IS CONTACTED BY DEPRESSING A KEY LOCATED AT A HOUSING WALL WHICH MAKES AN ANGLE WITH THE PRINTED CIRCUIT BOARD

BACKGROUND OF THE INVENTION

1. Field of the Invention

The present invention relates to a device including a housing, a built-in electric printed circuit board and at least one key positioned near to a wall of the housing at an angle relative to the printed circuit board, the at least one key including at least a movable key portion that can be depressed substantially perpendicularly to the wall, a movable first contact actuator portion aligned to the movable key portion inside the housing, and a movable contact portion cooperating with the movable key portion for making breakable electrical contact with electrically conducting parts of the printed circuit board.

2. Description of the Related Art

A device of this type is known, for example, from U.S. Pat. No. 5,293,017. This patent describes various types of devices such as calculators and other portable electronic arrangements such as mobile radios, remote controls, and so on. Said United States patent offers a solution to the technical problem that a key is depressed in a direction substantially parallel with the face of the printed circuit board accommodated in the device, but that nevertheless, by depressing the key, the movable contact portion is to make contact with the electrically conducting patterns on the surface of the printed circuit board. The solution is sought in the mounting of an elongated compound contact element in a fixed position on top of the printed circuit board and in causing this element to make electrically conducting contact on the underside with conducting tracks on the printed circuit board. On a side at a right angle to the printed circuit board, the contact element is arranged for making contact with the contact portion of the depressible key portion. A disadvantage of this solution is that a special and, moreover, relatively complicated contact element is to be provided that is additionally to be positioned and mounted at the right spot on the printed circuit board.

OBJECT AND SUMMARY OF THE INVENTION

It is an object of the invention to provide a device of the type defined in the opening paragraph, which has a simple structure and does not need an additional electrically conducting contact element and is characterized by the key portion is located on a first face of a first part of an elastic carrier plate located near to the wall inside the housing, the first contact actuator portion is located on an opposite second face of the first part of the elastic carrier plate, the contact portion is connected to the first face of the elastic carrier plate turned towards the printed circuit board, a movable second contact actuator portion is located on the second face of the second part of said elastic carrier plate and aligned to the contact portion, and the first and second contact actuator portions are arranged to cooperate such that when the key portion is depressed the first contact actuator portion moves in a first direction, and in response to this movement the second contact actuator portion moves in a second direction causing the contact portion to move towards the printed circuit board.

Many press-button arrangements of the type suitable for devices of the type discussed here contain an elastic carrier plate which, by means of semi-spherical structures introduced therein, produces the force necessary for bringing a key, after being pressed, back to its original position. Furthermore, the advantage of such known elastic carrier plates is that a large number of key portions can be integrated on these plates and that also a completely closed shielding is provided insofar as the elastic carrier plate is positioned over the printed circuit board. In the device according to the invention, portions present on an elastic carrier plate cooperate with each other in such a way that a depression of the key portion in one direction, for example, substantially about parallel with the printed circuit board, results in a depression of the relevant contact actuator portion in another direction, that is, in a direction towards the contact portion.

A preferred embodiment according to the invention is characterized in that the first and second contact actuator portions form protrusions on the second face of the elastic carrier plate, each protrusion having a free end turned away from the carrier plate, the free end of the protrusion of the first contact actuator portion is located near to the free end of the protrusion of the second contact actuator portion, and the first and second contact actuator portions are further arranged to cooperate such that when the first contact actuator portion moves in a first direction the protrusion of the first contact actuator portion comes in physical contact with the protrusion of the second contact actuator portion. In this embodiment, the desired depression of the contact actuator portion occurs when the key portion is depressed by the cooperation of the free ends of these two portions without connecting parts, transfer parts and the like being necessary. The portions concerned are present on the elastic carrier plate and, after the first and second parts of the elastic carrier plate have been put in the right position relative to each other, cooperate with each other without the intervention of other parts, because the free ends cooperate with each other.

In accordance with a further aspect of the invention, the first contact actuator portion cooperates with friction with a face of the second contact actuator portion that is at an angle, so that the desired movement is obtained in another direction.

A further aspect of the present invention is that the first and second parts of the elastic carrier plate are connected by an integral hinge comprising a thinned part of the elastic carrier plate. This aspect is interesting for interconnecting the first and second parts of the elastic carrier plate as one whole. For fastening the first part of the electric carrier plate in the housing of a device, use can be made of the feature that a spring clip fixes the first part of the elastic carrier plate near to the wall of the housing in a position at an angle relative to the second part of the carrier plate. An embodiment that is interesting to telephony devices, remote controls and so on may be favorably arranged in that the device has a front wall parallel with the printed circuit board, and a set of front keys depressible substantially perpendicularly to the front wall is present in the front wall, each front key having a depressible front key portion that can be moved onto the second face of the second part of the elastic carrier plate, and a front key contact portion aligned to the front key portion is present on the first face of the second part of the elastic carrier plate.

These and other aspects and features of the invention are apparent from and will be elucidated, by way of non-limitative example, with reference to the embodiment described hereinafter.

DETAILED DESCRIPTION OF THE PREFERRED EMBODIMENTS

Figure 1:
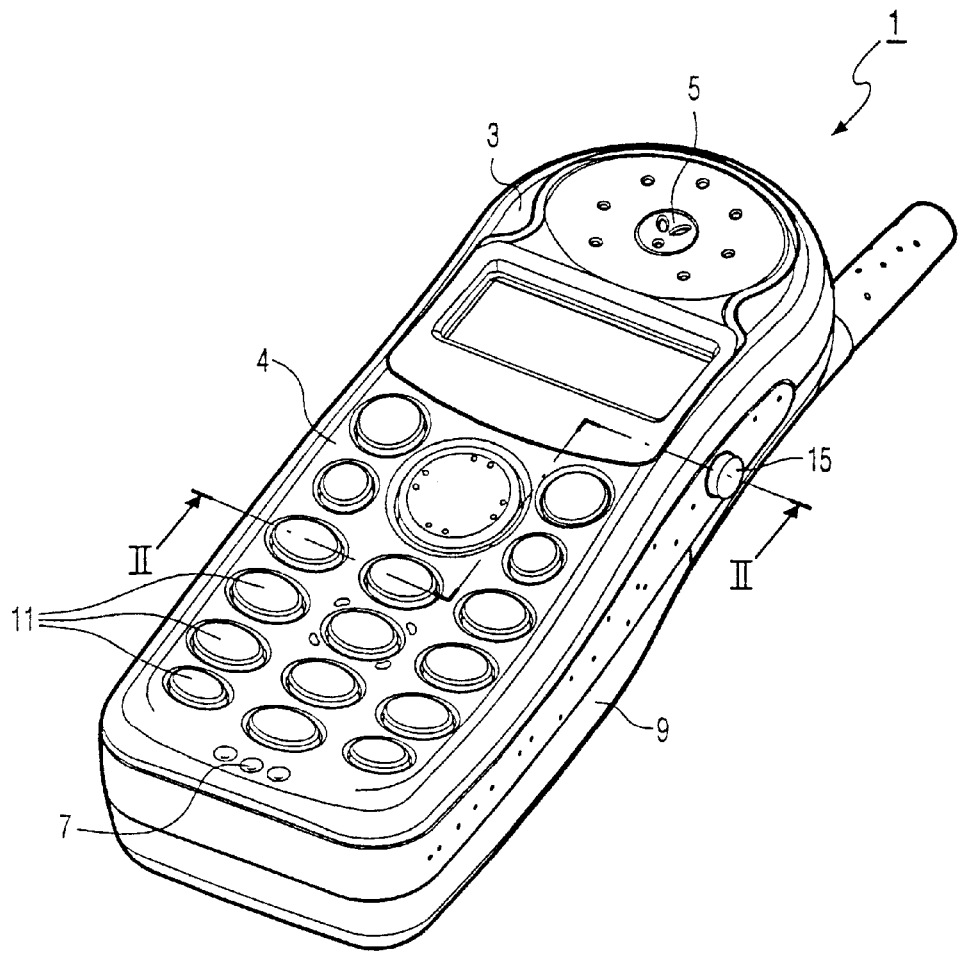
FIG. 1 shows a diagrammatic perspective view of a mobile telephone having a plurality of front keys and a side key.

FIG. 1 shows a mobile telephone 1 having a housing 3 with local openings 5 and 7 for an earphone and a microphone, respectively. The housing comprises a front wall 4 and a side wall 9 that is substantially perpendicular to the front wall. In the front wall 4 there are a plurality of front keys 11 that can be depressed substantially perpendicularly to the front wall 4. Inside the housing 3 there is a printed circuit board 13 substantially parallel with the front wall 4 and underneath the front keys 11, which printed circuit board on the side turned to the front keys has a pattern of electrical conductors (not shown). In the side wall 9 of the housing 3 there is a key set which in this case comprises only a single side key 15. This set of keys may also include more side keys in the wall 9 or in another side wall of the telephone.

Both the front keys 11 and the side key 15 cooperate with an elastic carrier plate 17 which includes a first part 17A inside the housing near to the side wall 9 and a second part 17B located near to the front wall 4.

In the embodiment shown, the front keys 11 have each a key portion 19 that is formed as one whole with the second part 17B of the carrier plate. Also the key 15 has a key portion formed as one whole with the carrier plate 17, referenced by the reference numeral 21. Furthermore, inside the housing 3 there is a movable contact actuator portion 23 cooperating with the movable key portion 21 and a cooperating movable contact portion 25 for making breakable electrical contact with electrically conducting parts of the printed circuit board 13. As for the keys 11, the key portions 19 themselves form contact actuator portions cooperating with contact portions 26 similar to the contact portion 25 that has already been mentioned above.

Figure 2:
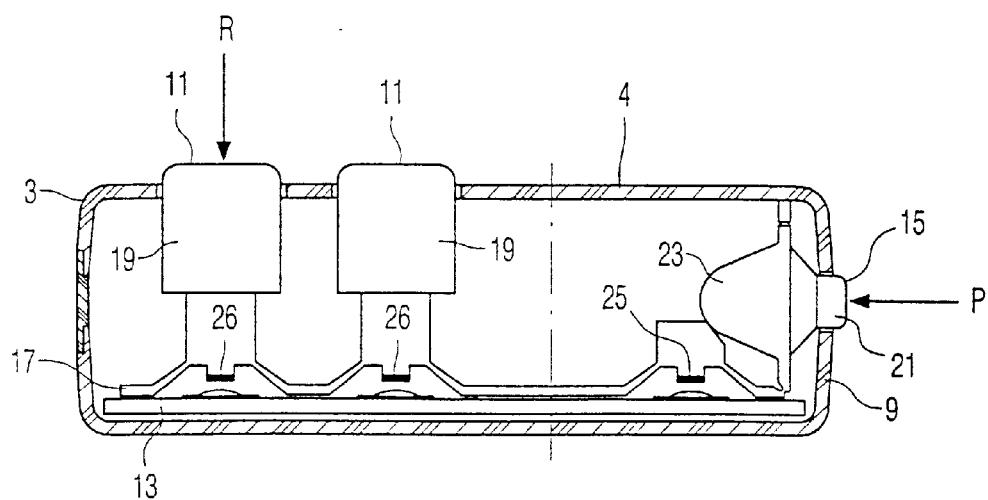
FIG. 2 shows a cross-section along the arrows II—II in FIG. 1.
Figure 3:
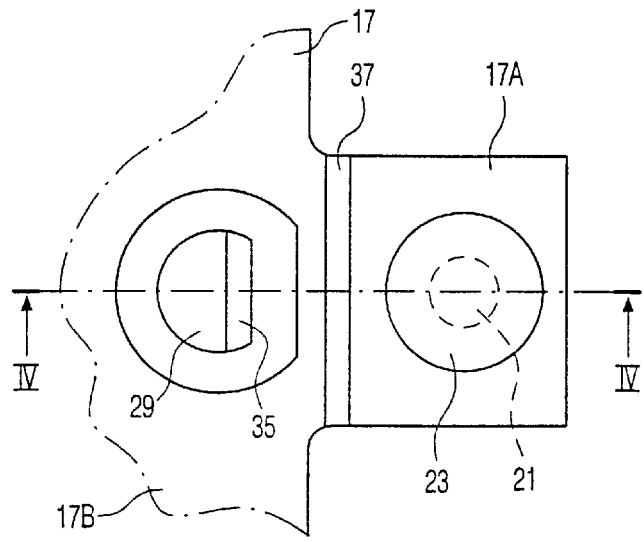
FIG. 3 is a plan view of a part of an elastic carrier plate, the first part of the carrier plate being shown as well as a part of the second carrier plate connected thereto via an elastic hinge, both being shown in the same plane.
Figure 4:
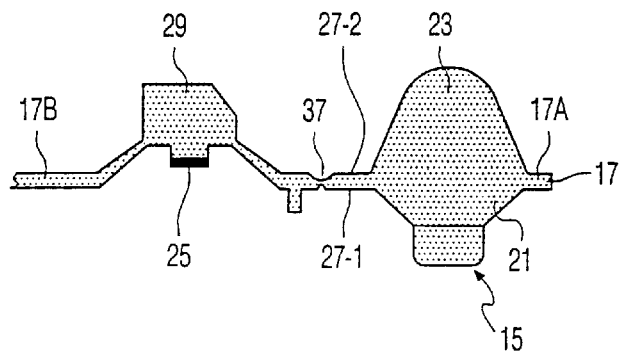
FIG. 4 is a cross-section along line IV—IV in FIG. 3.

As can notably be seen in FIGS. 3 and 4, the depressible key portion 21 is located on a first face 27-1 of a first part 17A of the elastic carrier plate 17 present inside the housing 3 near to the side wall 9. The first movable contact actuator portion 23 is located on the opposite face 27-2 of the first part 17A of the elastic carrier plate 17 and the contact portion 25 is connected to the first face 27-1 of the elastic carrier plate 17, which first face 27-1 is turned towards the printed circuit board 13. A second movable contact actuator portion 29 is located on the second face 27-2 of the second part 17B of the elastic carrier plate 17 and is aligned to the contact portion 25. The first contact actuator portion 23 cooperates with the second contact actuator portion 29 for moving the second contact actuator portion 29 in the direction Q of the contact portion 25 when the key portion 21 is depressed in the direction P. The first contact actuator portion 23 and the second contact actuator portion 29 of the side key 15 form protrusions on the second face 27-2 of the elastic carrier plate 17 and have a free end 31, 33 respectively, turned away from the carrier plate 17. The free end 31 of the first contact actuator portion 23 is located near to the free end 33 of the second contact actuator portion 29. By depressing the key portion 21 of the side key 15 in the direction of the arrow P, the contact portion 25 moves in the direction Q towards the printed circuit board 13 as a result of the cooperation between the two free ends 31 and 33 of the contact actuator portions 23 and 29, respectively. In the arrangement shown, particularly in FIGS. 2 and 5, the directions P and Q are substantially perpendicular to one another.

Figure 5:
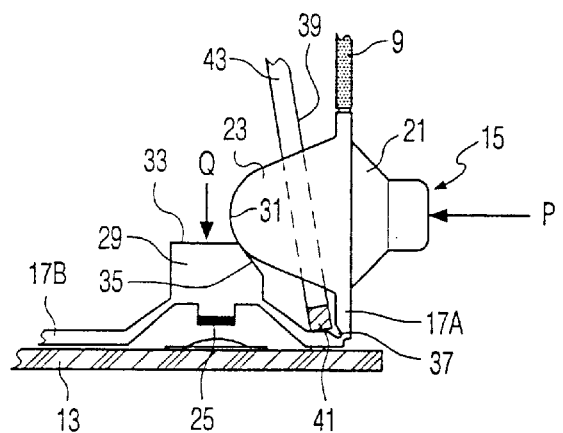
FIG. 5 is a part of FIG. 2 on an enlarged scale that better shows the cooperation between the side key and the printed circuit board of the telephone of FIG. 1.

As can clearly be seen, particularly in FIG. 5, the first contact actuator portion 23 of the side key 15 has the form of a cone rounded off near to the free end 31, and the second contact actuator portion 29, near to the free end 33 thereof and near to the free end 31 of the first contact actuator portion 23, has a face 35 that is at an angle relative to the direction of movement P of the first contact actuator portion 23. In the embodiment shown this angle is about 45°.

To enable easy bending of the first part 17A relative to the second part 17B of the elastic carrier plate 17, the first part is connected to the second part by an integral hinge 37, which comprises a locally thinned part of the elastic carrier plate 17 in the embodiment shown.

The first part 17A of the elastic carrier plate near to the side wall 9 of the housing 3 is at an angle of about 90° relative to the second part 17B of the carrier plate and is fixed in this position by a spring clip 39. With a lower portion 41 this clip presses the carrier plate 17 right next to the integrated hinge 37 against the printed circuit board 13 or, as desired, against another fixed part of the telephone. On either one of the two sides of the part 41 there are upright legs 43 one of which is shown in FIG. 5. Near to the ends, these legs rest in a slightly elastically spread position against further parts (not shown) of the telephone housing 3.

Also the front keys 11 of the telephone discussed here can be depressed substantially perpendicularly to the front wall, that is, in the direction of the arrow R, see FIG. 2 for the leftmost key. The key portions 19 form one whole with the carrier plate 17 and are found on the second face 27-2 of the second part 17B of the elastic carrier plate 17. An associated contact portion 26, aligned to each of the key portions 19, is present on the first face 27-1 of the second part 17B of the elastic carrier plate 17.

Although the invention has been described above with reference to only a single example of embodiment, the invention is not at all restricted thereto but, in contrast, comprises any embodiment that is possible within the spirit and scope of the invention defined by claim 1. For example, the device need not be a telephone and only a single key may be present on the device as appropriate. Within the spirit and scope of the invention it is only important for an elastic carrier plate to be present on which two key actuator portions are present on a single face, so that a displacement of one key actuator portion causes the second key actuator portion to be displaced in another direction, as a result of which a contact portion is moved to be brought into contact with the electrically conducting parts of a printed circuit board.

What is claimed is:

1. A device comprising a housing, a built-in electric printed circuit board and at least one key positioned near to a wall of the housing at an angle relative to the printed circuit board, said at least one key comprising at least a movable key portion that can be depressed substantially perpendicularly to said wall, a movable first contact actuator portion aligned to the movable key portion inside the housing, and a movable contact portion cooperating with the movable key portion for making breakable electrical contact with electrically conducting parts of the printed circuit board, wherein:

the key portion is located on a first face of a first part of an elastic carrier plate located near to said wall inside the housing, the first contact actuator portion is located on an opposite second face (27-2) of the first part of the elastic carrier plate, the contact portion is connected to the first face of the elastic carrier plate turned towards the printed circuit board, a movable second contact actuator portion is located on the second face of the second part of said elastic carrier plate and aligned to the contact portion, and the first and second contact actuator portions are arranged to cooperate such that when the key portion is depressed the first contact actuator portion moves in a first direction, and in response to this movement the second contact actuator portion moves in a second direction causing the contact portion to move towards the printed circuit board.

2. A device as claimed in claim 1, wherein:

the first and second contact actuator portions form protrusions on the second face of the elastic carrier plate, each of the protrusions having a free end turned away from the carrier plate, the free end of the protrusion of the first contact actuator portion is located near to the free end of the protrusion of the second contact actuator portion, and the first and second contact actuator portions are further arranged to cooperate such that when the first contact actuator portion moves in the first direction the protrusion of the first contact actuator portion comes in physical contact with the protrusion of the second contact actuator portion.

3. A device as claimed in claim 2, wherein:

the first contact actuator portion near to the free end thereof has the shape of a rounded off cone, and the second contact actuator portion near to the free end thereof and near to the free end of the first contact actuator portion has a face that is at an angle relative to the first direction.

4. A device as claimed in claim 1, wherein the first and second parts of the elastic carrier plate are connected by an integral hinge comprising a thinned part of the elastic carrier plate.

5. A device as claimed in claim 1, wherein a spring clip fixes the first part of the elastic carrier plate near to said wall of the housing in a position at an angle relative to the second part of the carrier plate.

6. A device as claimed in claim 1, wherein:

the device has a front wall parallel with the printed circuit board, and a set of front keys depressible substantially perpendicularly to the front wall is present in the front wall, each of the front keys having a depressible front key portion that can be moved onto the second face of the second part of the elastic carrier plate, and a front key contact portion aligned to the front key portion is present on the first face of the second part of the elastic carrier plate.

* * * * *